(12) United States Patent
Lee

(10) Patent No.: US 8,797,771 B1
(45) Date of Patent: Aug. 5, 2014

(54) CAPACITOR BASED AC TO DC STEP UP CONVERTER

(75) Inventor: Edward K. F. Lee, Fullerton, CA (US)

(73) Assignee: Alfred E. Mann Foundation for Scientific Research, Santa Clarita, CA (US)

(*) Notice: Subject to any disclaimer, the term of this patent is extended or adjusted under 35 U.S.C. 154(b) by 113 days.

(21) Appl. No.: 13/600,065

(22) Filed: Aug. 30, 2012

Related U.S. Application Data

(60) Provisional application No. 61/529,732, filed on Aug. 31, 2011.

(51) Int. Cl.
*H02M 3/18* (2006.01)
*G05F 1/577* (2006.01)

(52) U.S. Cl.
USPC ............................. 363/61; 363/63; 323/267

(58) Field of Classification Search
CPC ................. H02M 2001/007; H02M 2001/009;
H02M 1/12; H02M 7/062; H02M 3/07;
H02M 7/103; H02M 1/32; H02M 3/33592;
Y02B 70/126; H02H 7/127; H02P 7/0044

USPC ........... 363/44, 52, 53, 59, 60, 61, 63, 84, 86,
363/125, 126, 127, 128; 323/266, 267;
307/109, 110; 327/536
See application file for complete search history.

(56) References Cited

U.S. PATENT DOCUMENTS 6,396,724 B1 * 5/2002 Hirst ............................. 363/125

* cited by examiner

*Primary Examiner* — Gary L Laxton
*Assistant Examiner* — Alex Torres-Rivera
(74) *Attorney, Agent, or Firm* — Malcolm J. Romano

(57) ABSTRACT

An AC-DC step-up converter circuit architecture for generating multiple output voltages, both positive and negative, in an implantable biomedical device is disclosed. Switches and active rectifiers are used inside the converter for charging capacitors from the AC source and delivering currents to the loads. Regulated output voltages with high power efficiency are obtained by controlling the on/off times of the switches using feedback loops that include integrator circuits configured to provide control parameters related to the various output voltages and their associated predetermined reference voltages.

23 Claims, 10 Drawing Sheets

CAPACITOR BASED AC TO DC STEP UP CONVERTER

CROSS REFERENCE TO RELATED APPLICATIONS

This application claims the benefit under 35 USC 119(e) of Provisional Application No. 61/529/732 which was filed on Aug. 31, 2011, and which is hereby incorporated by reference in its entirety.

FIELD OF THE INVENTION

This disclosure relates generally to electronic integrated circuits for use typically in implantable biomedical devices. More specifically, the disclosure relates to a timing controlled capacitor based AC to DC step-up converter.

BACKGROUND OF THE INVENTION

Biomedical implantable devices have been developed using functional electrical stimulation (FES) techniques for restoring lost or diminished neurological functions or muscular disabilities. FES characteristically utilizes current pulses applied to target nerves or reflex centers in programmable patterns and sequences by means of electrical stimulators. To compensate for nerve and tissue impedances, a high output voltage is typically required for the electrical stimulators. Since many implantable devices are powered by means of inductive coupling between an internal coil and externally applied magnetic fields, techniques have been developed to generate a sufficiently high output voltage in order to accomplish successful FES. One common technique is to generate a high AC induced voltage on a coil such that a high output voltage can be obtained by the use of linear regulators configured to regulate the AC induced voltage (see for example, K. Chen et al., "An integrated 256 Channel Epiretinal Prosthesis", IEEE Journal of Solid State Cir., vol. 45, pp 1946-1956, September 2010). Other circuits in the implant may also require reliable regulated voltages, typically low voltages, which would require additional regulators coupled to the high voltage output. The net result of such approach is a system that is usually not power efficient due to losses on the regulators and rectifiers especially when the low voltage circuits are consuming large amounts of power.

In another approach to generating a high output voltage, an induced AC voltage with an amplitude sufficiently high to supply the requirements of low voltage circuits is used to generate a low regulated voltage which is then up converted using a switched capacitor DC-DC converter or a boost converter (see for example X. Zhang and H. Lee, "An Efficiency-Enhanced Auto-Reconfigurable 2x/3x SC Charge Pump for Transcutaneous Power Transmission", Proc. of IEEE, CICC, pp 311-314, September 2009). In addition to the power loss in the rectifier using this approach, the switched capacitor DC-DC converter may also have high power losses during voltage regulation when generating different output voltages. Additionally, when a boost converter is used, a bulky inductor necessary for converter operation is required to fit inside the implant which typically has severe size constraints and therefore limits the applications for the use of such converters. Accordingly, in overcoming the deficiencies of the currently available circuits and approaches, a capacitor based AC-DC step up converter is disclosed for the generation of output voltages. Uniquely, multiple output voltages are generated to satisfy simultaneous requirements for high voltage stimulator applications along with requirements for low voltage stimulator applications. Therefore, the overall power dissipation, when considering all of the stimulators, can be minimized when connecting the stimulators to the appropriate and different output voltages.

SUMMARY OF THE INVENTION

An example embodiment of the invention discloses a timing controlled capacitor based AC-DC converter capable of providing multiple regulated positive and negative output voltages to a load circuit. With regard to providing multiple regulated positive output voltages, the converter comprises a time varying input signal source; a first input capacitor having first and second terminals, the first terminal being coupled to the input signal source, the second terminal being coupled to a first positive converter output through an active rectifier, the second terminal further being switchably coupled to a converter ground through a first switch and to a second positive converter output through a second switch; a second input capacitor having first and second terminals, the first terminal being coupled to the input signal source, the second terminal being coupled to a first negative converter output through an active rectifier, the second terminal further being switchably coupled to the converter ground through a third switch and to a second negative converter output through a fourth switch; a first switch controller coupled to said first switch for controlling the time at which the first switch is closed and the duration of such switch closure, wherein said first switch controller comprises an integrator configured to integrate the difference between a function of the first positive converter output and a predetermined first reference voltage to provide thereby a first control signal and wherein the controller causes the first switch to close when the voltage at the first input capacitor second terminal falls below ground level and further causes the first switch to open when the voltage at the first input capacitor second terminal falls below the value of the first control signal; and a second switch controller coupled to said second switch for controlling the time at which the second switch is closed and the duration of such switch closure, wherein said second switch controller comprises an integrator configured to integrate the difference between a function of the second positive converter output and a predetermined second reference voltage to provide thereby a second control signal and wherein the controller causes the second switch to close when the voltage at the first input capacitor second terminal rises above the second positive converter output and further causes the first switch to open when a function of the voltage at the first input capacitor second terminal rises above the value of the second control signal.

The converter is also capable of providing negative output voltages in a manner consistent with and in accordance with the principles as used for generating the positive output voltages described above except that monitored voltages and switching decisions are made during negative swings of relevant voltages. By virtue of the unique AC-DC converter circuit structure and switching protocol, the overall power dissipation of stimulators used in a candidate implantable medical device requiring various regulated output voltages, can be minimized. Moreover, since the converter converts a low induced voltage within the implantable medical device directly into high output voltages and the output voltages are regulated directly by controlling the on/off times of the switches, regulators are not required and high power conversion efficiency is obtainable.

DETAILED DESCRIPTION

Figure 1:
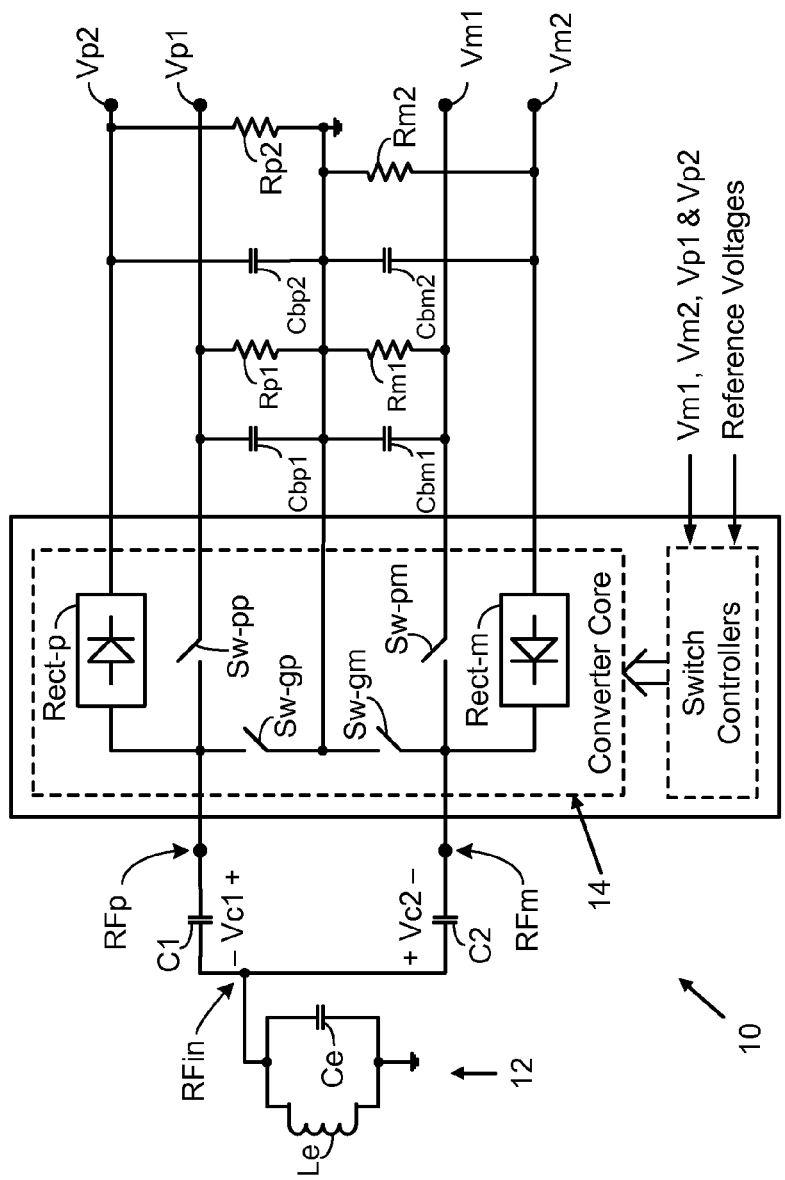
FIG. 1 shows an overall circuit architecture of an example embodiment of the present invention.

With reference to FIG. 1, there is shown an overall circuit architecture for a capacitor based AC-DC step up converter (CADSUC) 10. A tank circuit 12 comprising an "off chip" inductor Le and capacitor Ce, connected in parallel circuit arrangement, provides an induced low voltage AC signal from an external magnetic source (not shown). The induced voltage is provided by the inductor Le and the capacitor Ce is used for tuning the resonant frequency of the tank circuit 12 to the frequency of the magnetic source for maximizing power reception from the magnetic source. As is recognized in the field, an implantable medical device in which for example, the converter 10 is housed, must be in a hermetically sealed package in order to satisfy Food and Drug Administration (FDA) requirements regarding patient safety. Typically, Le is placed outside the hermetic package of the implant such that magnetic coupling to the coil will not be diminished because of shielding by the hermetic package materials. To prevent electrolysis on the coil terminals and to avoid damaging of the nerve tissues, Le must be AC coupled through DC blocking capacitors, which prevent any DC current flow from the circuits inside the hermetic package to the coil as well as through tissue in situations where the circuits, for any reason, malfunction.

Although one blocking capacitor is sufficient to block any of the above described unwanted DC currents, two capacitors, namely C1 and C2 are used. As will be discussed below, C1 and C2 are also utilized as part of converter 10 to generate two different positive output voltages, namely Vp1 and Vp2 as well as two different negative output voltages, namely Vm1 and Vm2. If desired and as an option, in addition to the bypass capacitors Cbp1, Cbp2, Cbm1 and Cbm2, only one extra off-chip capacitor is actually needed for converter 10, making this approach very attractive for implantable medical devices as compared to other approaches known in the art especially when considering size constraints imposed on implantable medical devices.

Figure 2:
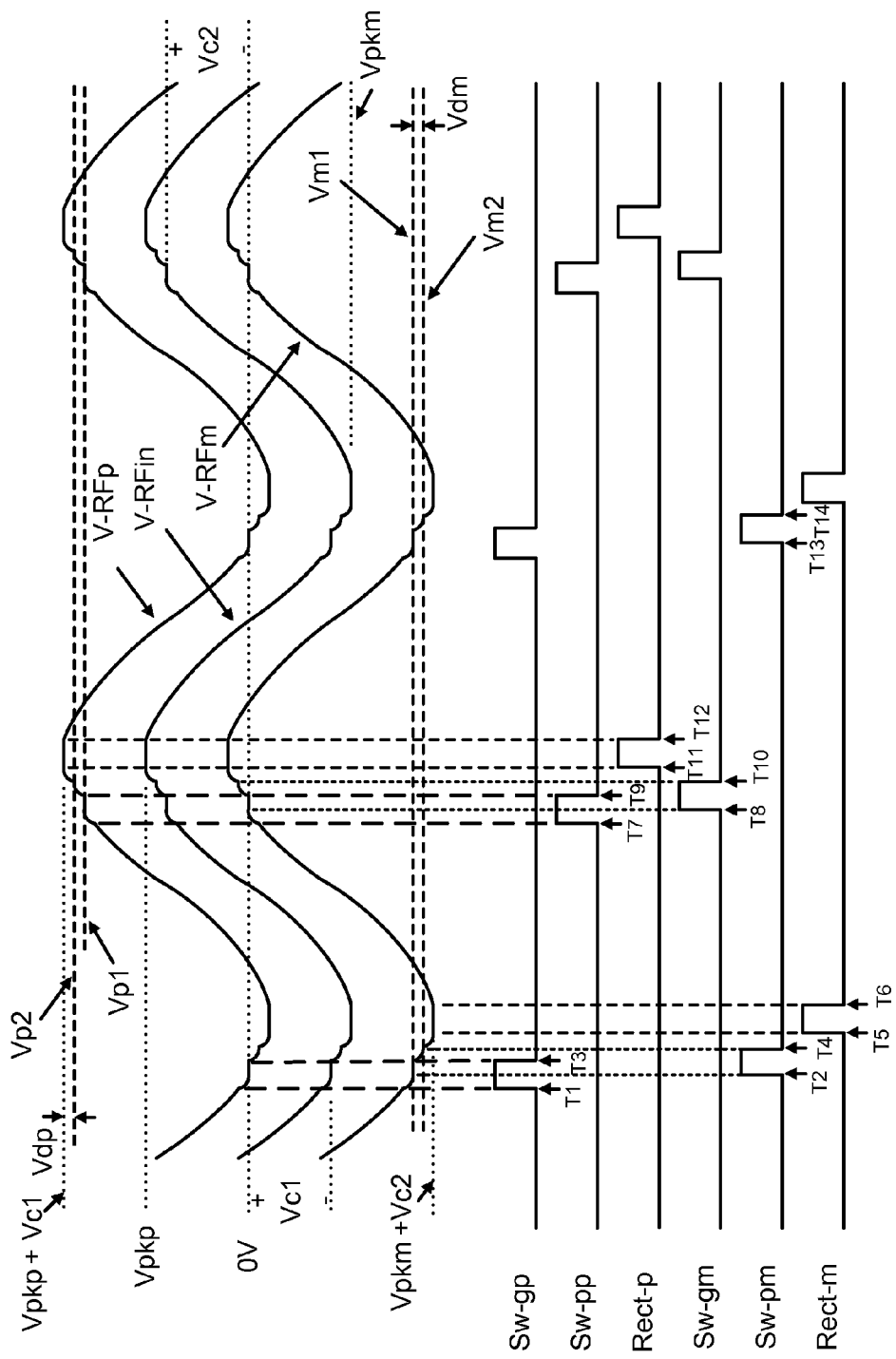
FIG. 2 shows a timing diagram for the embodiment shown in FIG. 1.
Figure 3:
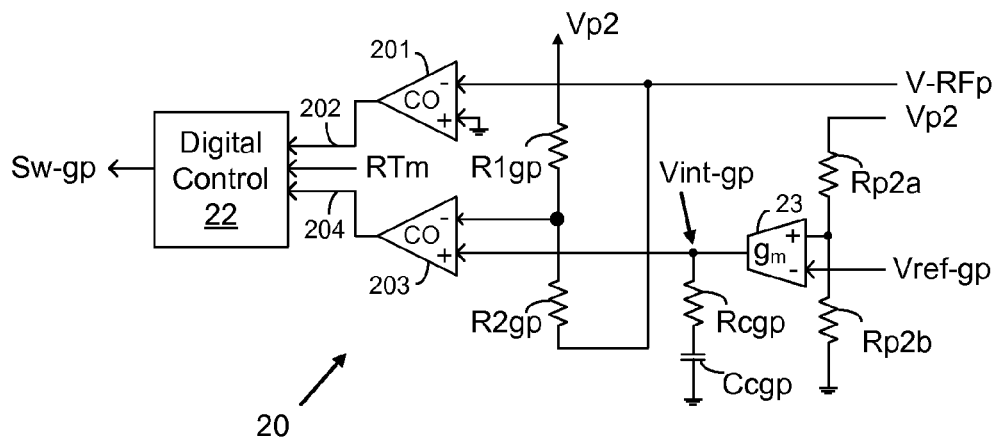
FIG. 3 shows a circuit diagram for a first switch controller for the embodiment shown in FIG. 1.
Figure 4:
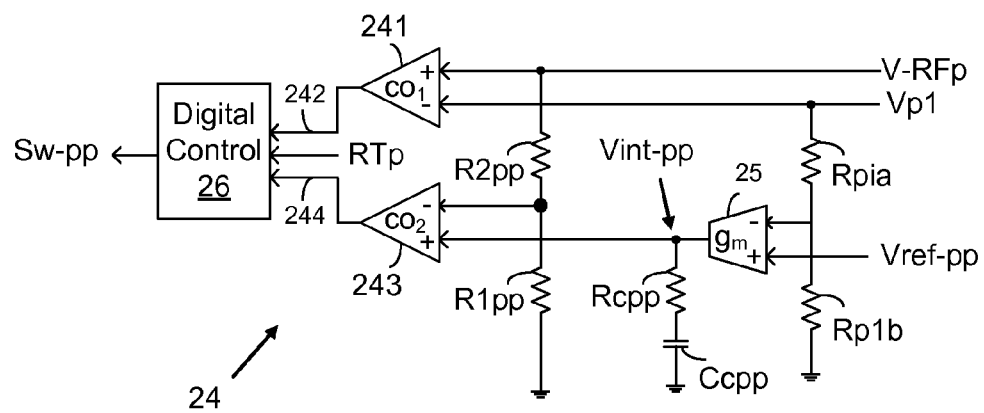
FIG. 4 shows a circuit diagram for a second switch controller for the embodiment shown in FIG. 1.

The capacitors C1 and C2 are coupled to the converter core 14, which includes a rectifier Rect-p (which can also be implemented as an active rectifier for reducing the voltage drop across Rect-p) and 2 switches, namely, Sw-gp and Sw-pp for generating the positive voltages Vp1 and Vp2 where the magnitude of Vp1 is equal to or greater than Vp2, otherwise written as Vp1≤Vp2. Several of the other components shown in FIG. 1, namely, Rect-m, Sw-gm and Sw-pm are utilized for generating the negative voltages Vm1 and Vm2 where the magnitude of Vm1 is less than or equal to Vm2, otherwise written as |Vm1|≤|Vm2|. The on/off times of the switches relating to the voltages Vp1 and Vp2 are controlled by the switch controllers 20 and 24 as shown in FIG. 3 and FIG. 4. As the skilled artisan will recognize, the switch controllers 30 and 36 controlling the on/off times of the switches relating to Vm1 and Vm2 follow the same principles of operation as those relating to Vp1 and Vp2. The timing of the switch operation and the on/off times of the rectifiers as well as the voltages on the nodes identified as RFin, RFp and RFm given as V-RFin, V-RFp and V-RFm, respectively identified in FIG. 1 in steady state are illustrated in FIG. 2.

To generate the voltages Vp1 and Vp2, the voltage across capacitor C1 is charged to the value Vc1 (voltage between nodes RFin and RFp in FIG. 1) by switching on switch Sw-gp (Sw-gp closes) for a period of time when the input signal voltage V-RFin reaches the value of approximately −Vc1. As a result, the voltage V-RFp (at node RFp in FIG. 1) will be level shifted up from the voltage V-RFin (at node RFin in FIG. 1) by a value equal to Vc1 in steady state as shown at time T1 in FIG. 2. When the voltage V-RFin reaches its positive peak value, Vpkp, the rectifier Rect-p will conduct a current from the coil Le through capacitor C1 to the output (terminal) Vp2 with an output voltage given as Vpkp+Vc1−Vdp where Vdp is the voltage drop across rectifier Rect-p and prevent current from flowing in the reverse direction. In order to achieve a regulated voltage Vp2 without using a linear regulator, the feedback loop consisting of the switch controller 20 for switch Sw-gp as shown in FIG. 3, is used for controlling the on/off times of switch Sw-gp and hence controls the value of Vc1. The average value of the voltage Vp2 is regulated to the desired value which is given by the equation:

$$[(Rp2a+Rp2b)/Rp2b] \cdot Vref\text{-}gp$$

where the voltage Vref-gp is an input reference voltage. Hence, the voltage gain to determine Vp2 as a function of Vref-gp is set by the voltage division established by the values of the resistors Rp2a and Rp2b.

The operation of the feedback loop is as follows: in each AC induced voltage cycle, the voltage stored across capacitor C1 decreases slightly after current has been supplied to the load Rp2 in FIG. 1. As is illustrated in FIG. 2, when the voltage V-RFin enters the negative cycle, the voltage V-RFp will also decrease. As the voltage V-RFp reaches a voltage just slightly below ground, the output 202, of comparator 201 in the switch controller 20 turns high, causing the digital control circuitry 22 to turn on switch Sw-gp at T1. As a result, the capacitor C1 will be recharged to a value of Vc1 through switch Sw-gp by the current flowing through inductor Le from node RFin to ground. Due to the equivalent finite impedance of the resonant tank circuit 12 consisting of Le and Ce, the voltages V-RFin and V-RFp may be slightly distorted as shown in FIG. 2. To regulate voltage Vp2, controller 20 samples voltage Vp2 through the voltage divider formed by resistors Rp2a and Rp2b. Transconductor 23 is configured to compare the output of the voltage divider with the reference voltage Vref-gp and integrate the voltage difference using capacitor Ccgp as an integrator until the difference between the divided value of Vp2 and Vref-gp is zero in steady state. The resistor Rcgp is added in series with the capacitor Ccgp merely for maintaining the stability of the entire feedback loop. The output voltage Vint-gp of transconductor 23 is used as a threshold value for comparator 203 in controller 20. Ideally, when the voltage V-RFp becomes more negative and reaches a value slightly below the voltage Vint-gp, the output 204 of comparator 203, will be high, causing the digital control 22 in controller 20 to turn switch Sw-gp off (Sw-gp opens) at T3 such that a correct amount of current is delivered to Rp2 for maintaining the average value of the voltage [Rp2b/(Rp2a+Rp2b)]·Vp2 equal to the voltage Vref-gp, in steady state. If the average value of the voltage [Rp2b/(Rp2a+Rp2b)]·Vp2 is greater than the voltage Vref-gp, the voltage Vint-gp will increase, causing the on time of switch Sw-gp to decrease such that less current will flow to the load thus reducing the voltage Vp2. Similarly, if the average value of the voltage [Rp2b/(Rp2a+Rp2b)]·Vp2 is less than the voltage Vref-gp, the voltage Vint-gp will increase, causing the on time of switch Sw-gp to increase such that more current will flow to the load thus increasing the voltage Vp2.

In this circuit implementation, the supply voltages used by controller 20 are Vp2 and ground. To keep the input and output voltage swings of comparator 203 and transconductor 23 within these supply voltages, the negative input of comparator 203 is connected through a voltage divider (R1gp and R2gp in FIG. 4) to V-RFp and Vp2. In this case, the feedback loop will force the average value of the voltage Vint-gp and hence, the common mode input range of comparator 203 to settle within the supply voltages. Note that the effects due to the offsets on comparator 203 and the voltage divider as well as the variations on Vpkp, Vdp and Rp2 are also compensated automatically by the feedback loop through adjustment of the voltage Vint-gp and hence, the voltage Vc1 when the following voltage condition is satisfied:

$$Vp2+\Delta V<2Vpkp-Vdp$$

where the value of $\Delta V$ is the sum of the voltage variations on Vpkp and Vdp from their nominal values under different load conditions.

Since the voltage stored on capacitor C1 is approximately a constant value equal to Vc1 and is recharged by the input signal V-RFin during each AC input cycle in steady state, the voltage across switch Sw-gp during the turn-on time is relatively small and hence, low power loss on switch Sw-gp is realized. However, for resistor Rp2 having a relatively small resistance value (high load current condition at the output terminal Vp2), the turn-on time for switch Sw-gp will be longer in order to compensate for the higher charge loss on C1. If the turn-on time extends beyond the negative peak of the voltage V-RFin, current will flow from node RFp back to node RFin, causing the output voltage Vp2 to be out of regulation and reducing the power efficiency. To maintain a high circuit operating efficiency even under this overload condition, switch Sw-gp is forced to turn off by imposing a logic 1 on the RT input of the digital logic control 22 when the negative peak of the voltage V-RFin (or V-RFp) is detected. The RT input signal is generated from active rectifier Rect-m (FIG. 1) as discussed later below.

Unlike the case for the voltage Vp2, which is obtained from the voltage V-RFp when V-RFp is at its peak value, the lower output voltage Vp1 is obtained by connecting the output Vp1 to V-RFp (using switch Sw-pp in FIG. 1) when V-RFp increases to a voltage just slightly above the desired value of Vp1, which can be between the values of 0.0 volts and Vp2. The output Vp1 is regulated to the desired value using a feedback loop that consists of controller 24 for switch Sw-pp as shown in FIG. 4. The output Vp1 is set by an input reference voltage Vref-pp and is regulated to a voltage value given by the equation [(Rp1a+Rp1b)/Rp1b]·Vref-pp. As the voltage V-RFin increases from its negative peak value, the voltage V-RFp also increases. When the value of V-RFp is just slightly higher than Vp1, comparator 241 in controller 24 will cause the digital control circuitry 26 to turn on switch Sw-pp (switch Sw-pp closes) at T7. Hence, current will flow from the coil Le through capacitor C1 and switch Sw-pp to the load Rp1 in FIG. 1. Vp1 is first attenuated by the voltage divider consisting of resistors Rp1a and Rp1b and then compared to the reference voltage Vref-pp by the transconductor 25 shown in FIG. 4. Similar to the case for regulating Vp2, the integrated output voltage Vint-pp, appearing at the output of transconductor 25 is used as a threshold value for turning off the switch Sw-pp (switch Sw-pp opens) through the use of comparator 243, which compares the value of Vint-pp to the attenuated value of V-RFp. If the average value of the voltage [Rp1b/(Rp1a+Rp1b)]·Vp1 is greater than the voltage Vref-pp, the voltage Vint-pp will decrease, causing the on time of Sw-pp to decrease such that less current will flow to the load thus reducing the voltage Vp1. Similarly, if the average value of the voltage [Rp1b/(Rp1a+Rp1b)]·Vp1 is less than the voltage Vref-pp, the voltage Vint-pp will increase, causing the on time of Sw-pp to increase such that more current will flow to the load for increasing the voltage Vp1. When the average value of the voltage [Rp1b/(Rp1a+Rp1b)]·Vp1 is equal to the reference voltage Vref-pp, the feedback loop reaches a steady state operating condition. In this case, the voltage Vint-pp remains unchanged, setting the correct timing to turn off switch Sw-pp at T9 such that the correct amount of current for keeping the average value of the voltage Vp1 equal to the value calculated by the equation [(Rp1a+Rp1b)/Rp1b]·Vref-pp is delivered to Rp1. Since the values of the voltages V-RFp and Vp1 are approximately the same during the turn-on time of switch Sw-pp as shown in FIG. 2, the power loss due to switch Sw-pp being in the on state, is relatively small. As is similar to the case for generating the output voltage Vp2, if the turn-on time for switch Sw-pp is extended beyond the positive peak value of V-RFp, the output Vp1, will potentially lose regulation and low power efficiency may result due to current flow from Vp1 back to node RFin in FIG. 1. To maintain high efficiency, the switch Sw-pp is forced to turn off by setting the RT input of digital logic control 26 to logic 1 when the positive peak value of V-RFp is detected. Note that the supply voltages of controller 24 for switch Sw-pp are Vp2 and ground.

If additional output voltages in the range between 0.0 volts and Vp2 are required, such output voltages can be generated in the same manner as Vp1. Only additional bypass capacitors, Sw-pp switches and the corresponding controllers are required but a capacitor in addition to capacitor C1 is not required. As a result, the number of off-chip components for generating additional output voltages can be kept at a minimum.

Figure 5:
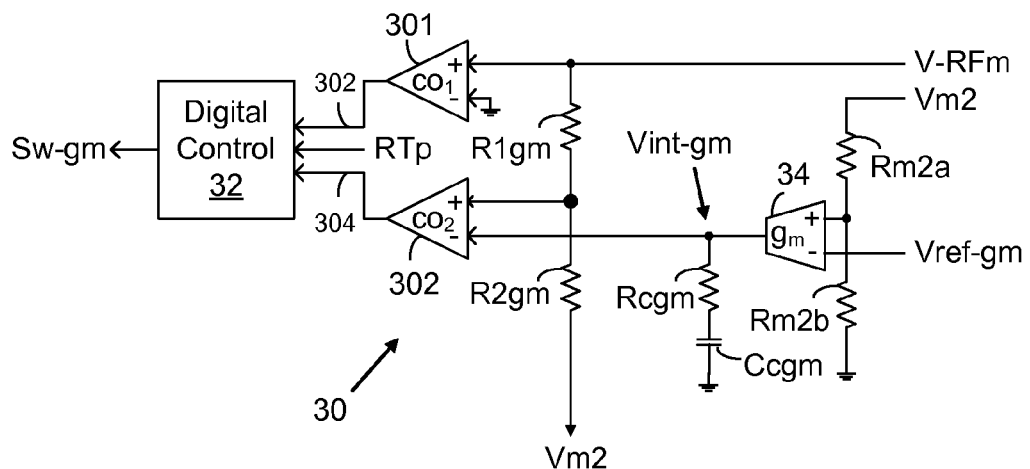
FIG. 5 shows a detailed circuit diagram of the switch (Sw-gp) shown in FIG. 1.

To generate the voltages Vm1 and Vm2, the voltage across C2 in FIG. 2 is charged to Vc2 (voltage between nodes RFin and RFm in FIG. 1) by switching on Sw-gm (Sw-gm closes) for a period of time when the input voltage V-RFin goes positive and reaches the value of approximately Vc2. As a result, the voltage V-RFm at node RFm in FIG. 1 will be level shifted down from V-RFin at node RFin in FIG. 1 by a value equal to Vc2 in steady state as shown in FIG. 2. When the voltage V-RFin reaches its negative peak value, −Vpkm, the rectifier Rect-m (which can be realized as an active rectifier for reducing the voltage drop of Rect-m) will conduct a current from Le through C1 to the output (terminal) Vm2 with an output voltage given as (−Vpkm−Vc2+Vdm) where Vdm is the voltage drop across rectifier Rect-m and prevents current from flowing in the reverse direction. In order to achieve a regulated voltage Vm2 without using a linear regulator, the feedback loop consisting of the switch controller 30 for switch Sw-gm as shown in FIG. 5 is used for controlling the on/off times of switch Sw-gm and hence controls the value of Vc2. The average value of the voltage Vm2 is regulated to the desired value given as $[(Rm2a+Rm2b)/Rm2b]\cdot Vref\text{-}gm$ where Vref-gm is an input reference voltage. Hence, the voltage gain to determine Vm2 as a function of Vref-gm is set by the voltage division established by the values of the resistors Rm2a and Rm2b.

The operation of the feedback loop is as follows: in each AC induced voltage cycle, the voltage stored on C2 decreases slightly after current has been supplied to the load Rm2 in FIG. 1. As is illustrated in FIG. 2, when the voltage V-RFin enters the positive cycle, the voltage V-RFm will also increase. As the voltage V-RFm reaches a voltage just slightly above ground, the output 302 of the comparator 301 in the switch controller 30 turns high, causing the digital control circuitry 32 to turn on switch Sw-gm at T8. As a result, capacitor C2 will be recharged to a value of Vc2 through switch Sw-gm by the current flow through Le from node RFin to ground. Due to the equivalent finite impedance of the resonant tank consisting of Le and Ce, the voltages V-RFin and V-RFm may be distorted as shown in FIG. 2. To regulate voltage Vm2, controller 30 samples voltage Vm2 through the voltage divider formed by resistors Rm2a and Rm2b as shown in FIG. 5. Transconductor 34 is configured to compare the voltage divider output with Vref-gm and integrates the voltage difference between the divided value of Vm2 and Vref-gm using Ccgm as an integrator until the voltage difference is zero in steady state. The resistor Rcgm is added only for maintaining the stability of the entire feedback loop. The output voltage Vint-gm of transconductor 34 is used as a threshold value for comparator 303 in controller 30. Ideally, when the voltage V-RFm becomes more positive and reaches a value slightly above Vint-gm, the output 304 of comparator 303 will be high, signaling the digital control 32 in controller 30 to turn switch Sw-gm off such that a correct amount of current is delivered to Rm2 for maintaining the average value of $[Rm2b/(Rm2a+Rm2b)]\cdot Vm2$ equal to the voltage Vref-gm in steady state. If the average value of the voltage $[Rm2b/(Rm2a+Rm2b)]\cdot Vm2$ is less than the voltage Vref-gm, the voltage Vint-gm will decrease, causing the on time of Sw-gm to decrease such that less current will flow to the load for increasing the voltage Vm2. Similarly, if the average value of the voltage $[Rm2b/(Rm2a+Rm2b)]\cdot Vm2$ is greater than the voltage Vref-gm, the voltage Vint-gm will increase, causing the on time of Sw-gm to increase such that more current will flow to the load to increase voltage Vm2.

In this circuit implementation, the supply voltages used by the controller 30 for Sw-gm are Vm2 and ground. To keep the input and output voltage swings of comparator 303 and transconductor 34 within these supply voltages, the positive input of comparator 303 is connected through voltage divider R1$1gm$ and R2$gmp$ in FIG. 5 to V-RFm and Vm2. In this case, the feedback loop will force the average value of the voltage Vint-gm and hence, the common mode input range of comparator 303 to settle within the supply rails. Note that the effects due to the offsets on 304 and the voltage divider as well as the variations on Vpkm, Vdm and Rm2 are also compensated automatically by the feedback loop through adjustment on Vint-gm and hence, Vc2 when the following condition is satisfied:

$$Vm2+\Delta V > -2Vpkm+Vdm;$$

where $\Delta V$ is the sum of the voltage variations on Vpkm and Vdm from their nominal values under different load conditions. In the above equation, $\Delta V$ can be either negative or positive.

Since the voltage stored on capacitor C2 is approximately a constant equal to Vc2 and is recharged by the input signal V-RFin during each AC input cycle in steady state, the voltage across switch Sw-gm during the turn-on time is relatively small and hence, low power loss on switch Sw-gm is realized. However, for resistor Rm2 having a small value and being connected to Vm2 (high load current condition), the turn-on time for switch Sw-gm will be longer to compensate for the higher charge loss on capacitor C2. If the turn-on time extends beyond the positive peak of the voltage V-RFin, current will flow from node RFm back to node RFin, causing the output voltage Vm2 out of regulation and reducing the power efficiency. To maintain a high circuit operating efficiency even under this overload condition, switch Sw-gm is forced to turn off by imposing a logic 1 on the RT input of the digital control 32 in controller 30 for switch Sw-gm when the positive peak of the voltage V-RFin (or V-RFm) is detected. The RT input signal is generated from the active rectifier Rect-p.

Figure 6:
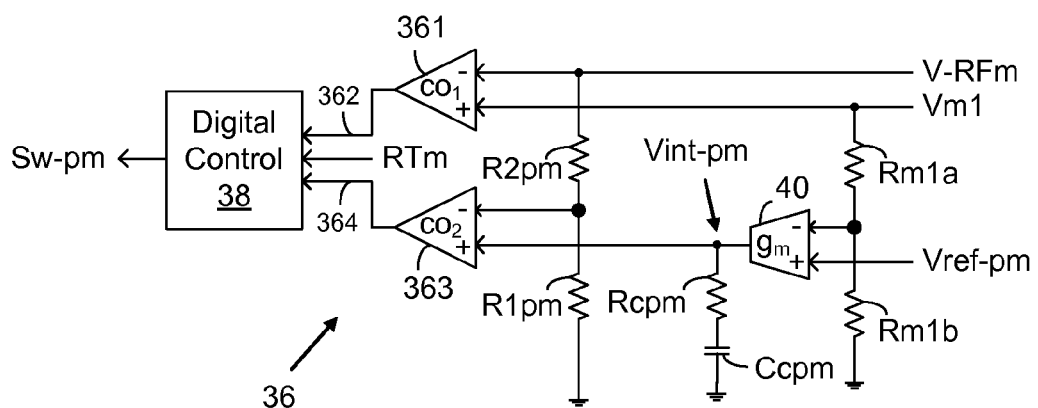
FIG. 6 shows a detailed circuit diagram of the switch (Sw-pp) shown in FIG. 1.

Unlike the case for the voltage Vm2, which is obtained from the voltage V-RFm when V-RFm is at its negative peak value, the output voltage Vm1 (with $|Vm1|<|Vm2|$) is obtained by connecting the output Vm1 to V-RFm using switch Sw-pm in FIG. 1 when the voltage V-RFm decreases to a voltage just slightly below the desired value of Vm1, which can be between the values 0.0 volts and Vm2. The output Vm1 is regulated to the desired value using a feedback loop that consists of controller 36 for switch Sw-pm as shown in FIG. 6. The voltage Vm1 is set by an input reference voltage Vref-gm and is regulated to a value given by the equation $[(Rm1a+Rm1b)/Rm1b]\cdot Vref\text{-}pm$. As the voltage V-RFin decreases from its positive peak value, the voltage V-RFm also decreases. When the value of V-RFm is just slightly lower than Vm1, comparator 361 in controller 36 for switch Sw-pm will cause digital control 38 to turn on switch Sw-pm at T2 (and T13, etc.). Hence, current will flow from Le through C2 and switch Sw-pm to the load Rm1 in FIG. 1. Vm1 is first attenuated by the voltage divider consisting of resistors Rm1a and Rm1b and then compared to reference voltage Vref-pm by transconductor 40. Similar to the case for regulating Vm2, the integrated output voltage Vint-pm, appearing at the output of transconductor gm, (40) is used as a threshold value for turning off switch Sw-pm through the use of comparator CO2, which compares the value of the voltage Vint-pm to the attenuated value of V-RFm. If the average value of the voltage $[Rm1b/(Rm1a+Rm1b)]\cdot Vm1$ is less than the voltage Vref-pm, the voltage Vint-pm will increase, causing the on time of Sw-pm to decrease such that less current will flow to the load thus increasing the voltage Vm1. Similarly, if the average value of the voltage $[Rm1b/(Rm1a+Rm1b)]\cdot Vm1$ is greater than the voltage Vref-pm, the voltage Vint-pm will decrease, causing the on time of Sw-pm to increase such that more current will flow to the load thus increasing the voltage Vm2. When the average value of the voltage $[Rm1b/(Rm1a+Rm1b)]\cdot Vm1$ is equal to the reference voltage Vref-pm, the feedback loop reaches a steady state operating condition. In this case, the voltage Vint-pm remains unchanged, setting the correct timing to turn off switch Sw-pm at T4 (and T14, etc.) such that the correct amount of current for keeping the average value of the voltage Vm1 equal to equal to the value calculated by the equation $[(Rm1a+Rm1b)/Rm1b]\cdot Vref\text{-}pm$ is delivered to Rm1.

Since the values of the voltages V-RFm and Vm1 are approximately the same during the turn-on time of switch Sw-pm as shown in FIG. 2, the power loss due to switch Sw-pm being in the on state, is relatively small. As is similar to the case for generating the output voltage Vm2, if the turn-on time for switch Sw-pm is extended beyond the positive peak value of V-RFm, the output Vm1 will potentially lose regulation and low power efficiency may result due to current flow from Vm1 back to node RFin. To maintain high efficiency, the switch Sw-pm is forced to turn off by setting the RT input of digital control 38 to logic 1 when the negative peak value of V-RFm is detected. The required RT signal is generated from the active rectifier Rect-m shown in FIG. 1.

Figure 7A:
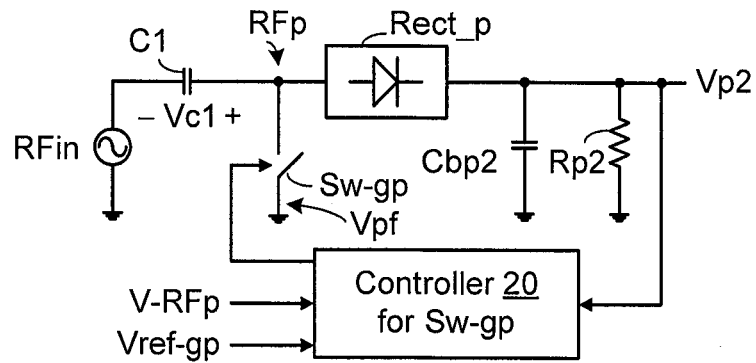
FIG. 7A shows a simplified circuit diagram for generating a first positive output voltage for the circuit shown in FIG. 1.
Figure 7B:
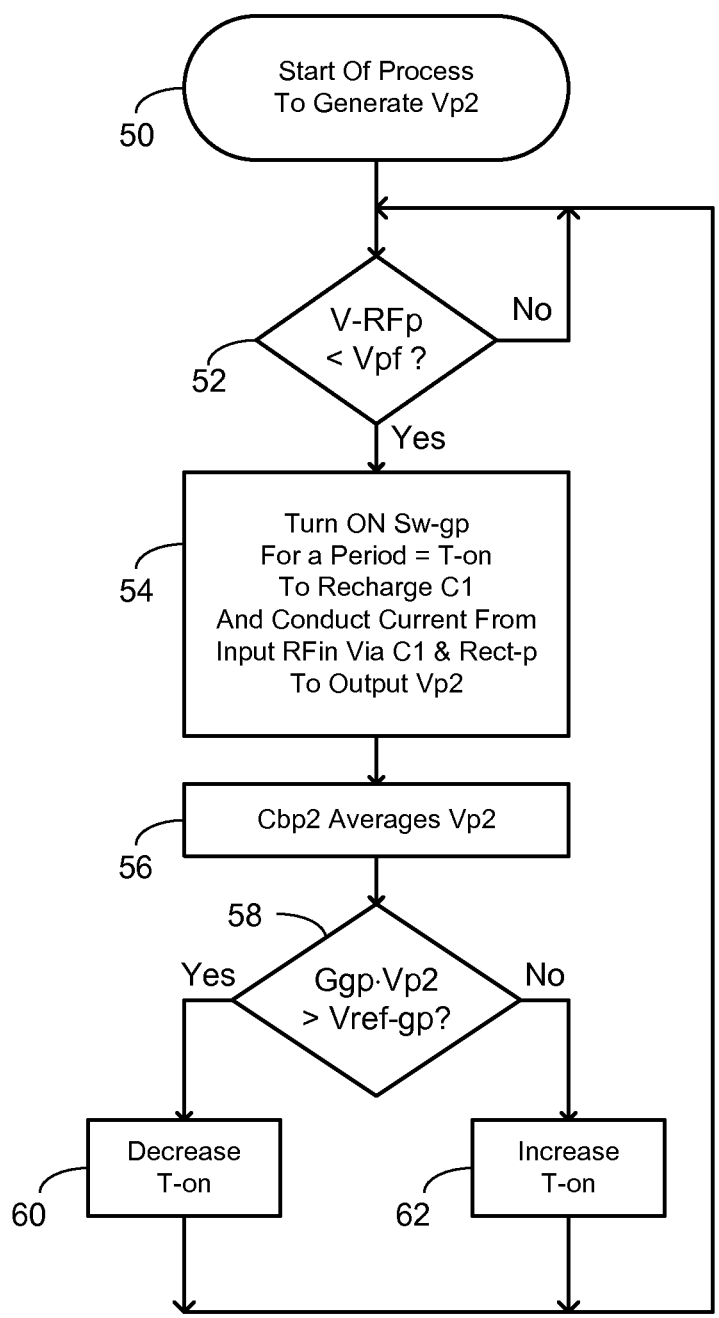
FIG. 7B is a flow chart relating to the operation of the circuit diagram of FIG. 7A.

With reference to FIG. 7A and FIG. 7B, there is shown a simplified circuit diagram in FIG. 7A of the system elements related to the switch Sw-gp shown in FIGS. 1 and 3 with an associated flow chart in FIG. 7B illustrating control of the "on time" of switch Sw-gp (switch Sw-gp closed) in order to regulate Vp2 to a predetermined value. Control commences at block 50. Vpf is a fixed dc voltage which in the present instance has been set to zero volts or ground as shown in FIG. 1. In block 52, the value of V-RFp is compared to the value of Vpf, and if V-RFp is less than the value of Vpf, controller 20 at block 54, turns on switch Sw-gp (switch Sw-gp closed) for a period of T-on to thereby charge capacitor C1 and current provided by source RFin through capacitor C1 and rectifier Rect-p is supplied to load Rp2 to establish the output voltage Vp2 for V-RFp being greater than Vp1. The average value of Vp2 is generated in block 56 by bypass capacitor Cbp2. In block 58 the average value of Vp2 multiplied by a gain factor Ggp formed by resistors Rp2a and Rp2b is compared to a preselected reference voltage Vref-gp by the use of at least transconductor 23 and capacitor Ccgp shown in FIG. 3. The value of Vp2 multiplied by the gain factor Ggp is compared to Vref-gp in block 58 and if Vp2 multiplied by the gain factor Ggp is greater than Vref-gp the "on time" of switch Sw-gp is decreased in block 60 and if Vp2 multiplied by the gain factor Ggp is less than Vref-gp the "on time" of switch Sw-gp is increased in block 62. Control is then returned to block 52 and switch Sw-gp is turned on only after V-RFp becomes less than Vpf and the process of controlling T-on proceeds through block 62.

Figure 8A:
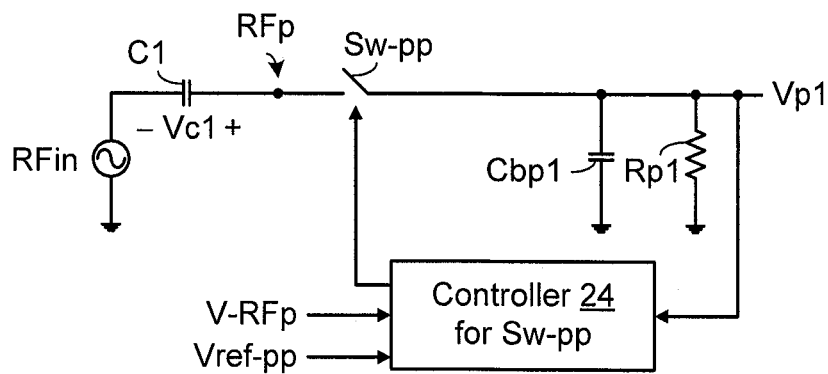
FIG. 8A shows a simplified circuit diagram for generating a second positive output voltage for the circuit shown in FIG. 1.
Figure 8B:
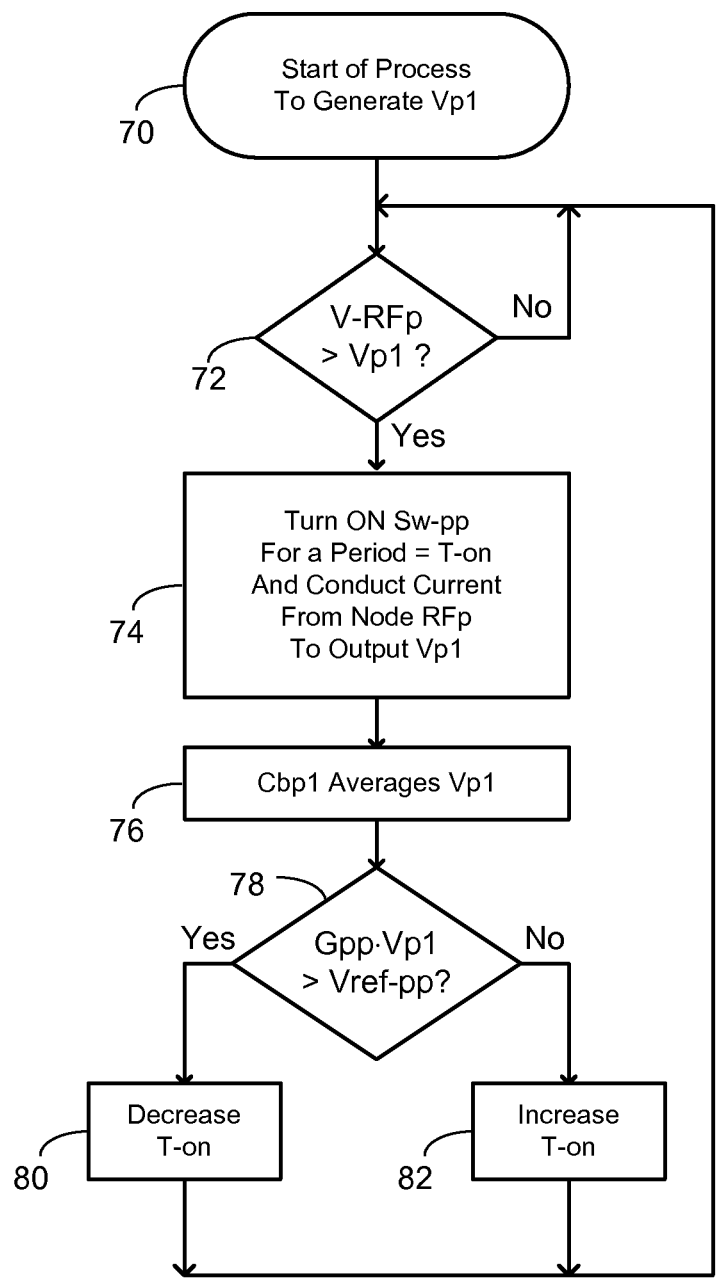
FIG. 8B is a flow chart relating to the operation of the circuit diagram of FIG. 8A.

With reference to FIG. 8A and FIG. 8B, there is shown a simplified circuit diagram in FIG. 8A of the system elements related to the switch Sw-pp shown in FIGS. 1 and 4 with an associated flow chart in FIG. 8B illustrating control of the "on time" of switch Sw-pp (switch Sw-pp closed) in order to regulate Vp1 to a predetermined value. Control commences at block 70. In block 72, the value of V-RFp is compared to the value of Vp1, and if V-RFp is greater than the value of Vp1, controller 24 at block 74, turns on switch Sw-pp (switch Sw-gp closed) for a period of T-on to conduct current from node RFp to output Vp1 through switch Sw-pp. At block 76, the average value of Vp1 is generated by bypass capacitor Cbp1. In block 78 the average value of Vp2 multiplied by a gain factor Gpp formed by resistors Rp1a and Rp1b is compared to a preselected reference voltage Vref-pp by the use of at least transconductor 25 and capacitor Ccpp shown in FIG. 4. The value of Vp1 multiplied by the gain factor Gpp is compared to Vref-pp in block 78 and if Vp1 multiplied by the gain factor Gpp is greater than Vref-pp the "on time" of switch Sw-pp is decreased in block 80 and if Vp1 multiplied by the gain factor Gpp is less than Vref-pp the "on time" of switch Sw-pp is increased in block 82. Control is then returned to block 72 and switch Sw-pp is turned on only after V-RFp becomes greater than Vp1 and the process of controlling T-on proceeds through block 82.

Figure 9A:
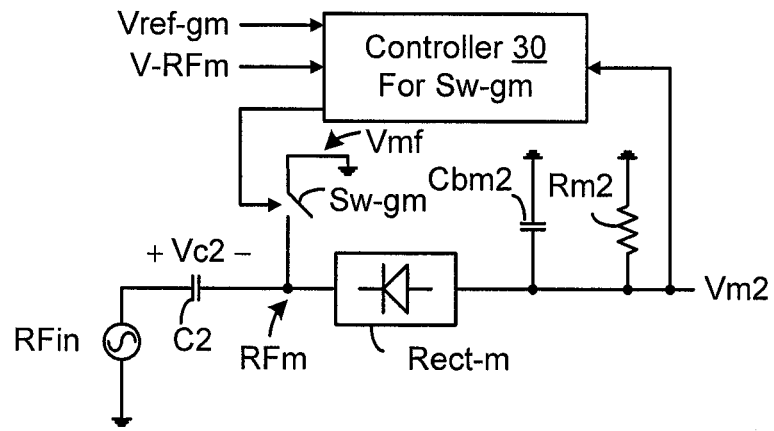
FIG. 9A shows a simplified circuit diagram for generating a first negative output voltage for the circuit shown in FIG. 1.
Figure 9B:
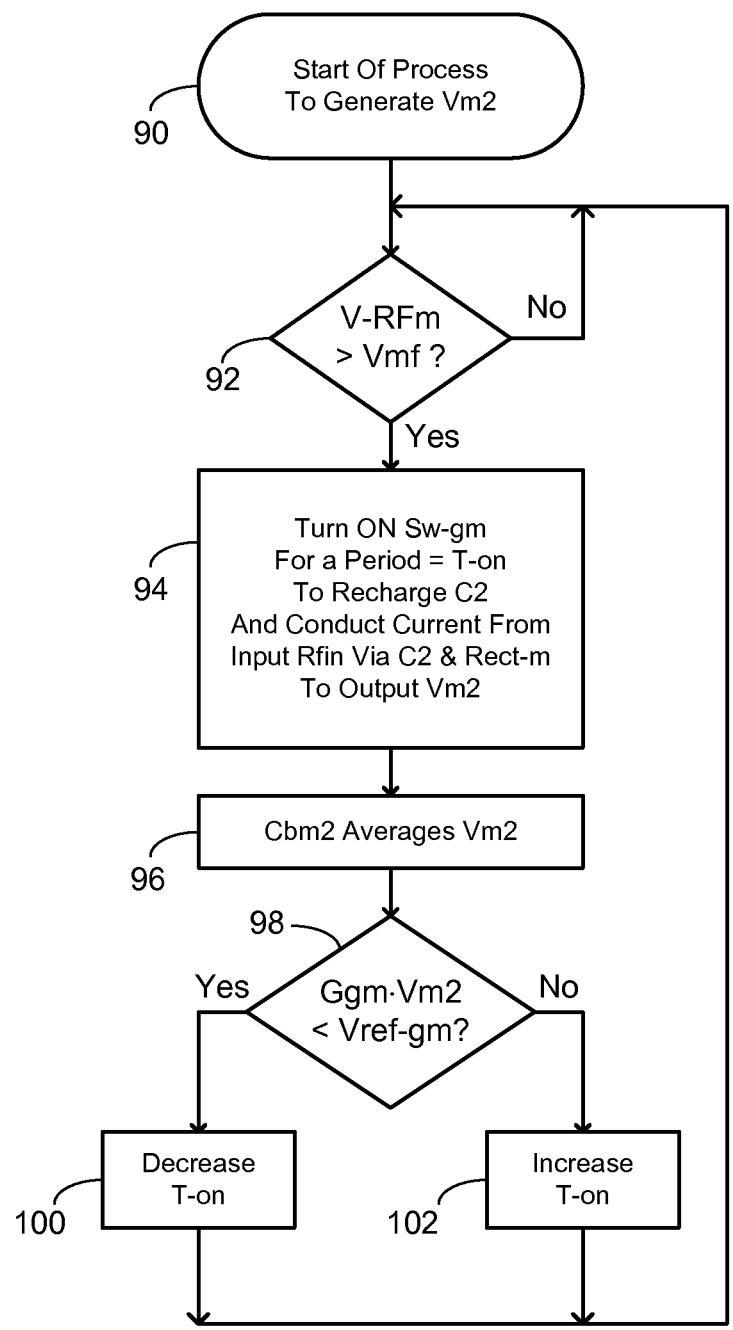
FIG. 9B is a flow chart relating to the operation of the circuit diagram of FIG. 9A.

With reference to FIG. 9A and FIG. 9B, there is shown a simplified circuit diagram in FIG. 9A of the system elements related to the switch Sw-gm shown in FIGS. 1 and 5 with an associated flow chart in FIG. 9B illustrating control of the "on time" of switch Sw-gm (switch Sw-gm closed) in order to regulate Vm2 to a predetermined value. Control commences at block 90. Vmf is a fixed dc voltage which in the present instance has been set to zero volts or ground as shown in FIG. 1. In block 92, the value of V-RFm is compared to the value of Vmf, and if V-RFm is greater than the value of Vmf, controller 30 at block 94, turns on switch Sw-gm (switch Sw-gm closed) for a period T-on to thereby charge capacitor C2 and current supplied by source RFin through capacitor C2 and rectifier Rect-m is supplied to load Rm2 to establish the output voltage Vm2 for V-RFm being less than Vm2. The average value of Vm2 is generated in block 96 by the use of bypass capacitor Cbm2. In block 98 the average value of Vm2 multiplied by a gain factor Ggm formed by resistors Rm2a and Rm2b is compared to a preselected reference voltage Vref-gm by the use of at least transconductor 34 and capacitor Ccgm shown in FIG. 5. The value of Vm2 multiplied by the gain factor Ggm is compared to Vref-gm in block 98 and if Vm2 multiplied by the gain factor Ggm is less than Vref-gm, the "on time" of switch Sw-gm is decreased in block 100 and if Vm2 multiplied by the gain factor Ggm is greater than Vref-gm, the "on time" of switch Sw-gm is increased in block 102. Control is then returned to block 92 and switch Sw-gm is turned on only after V-RFm becomes greater than Vmf and the process of controlling T-on proceeds through block 102.

Figure 10A:
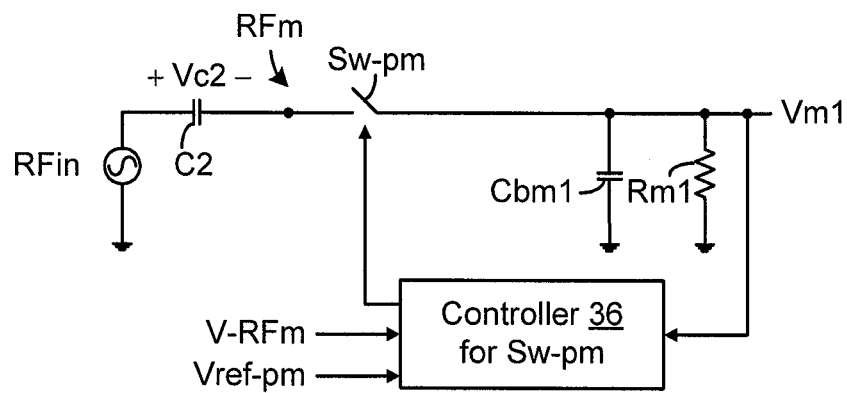
FIG. 10A shows a simplified circuit diagram for generating a second negative output voltage for the circuit shown in FIG. 1.
Figure 10B:
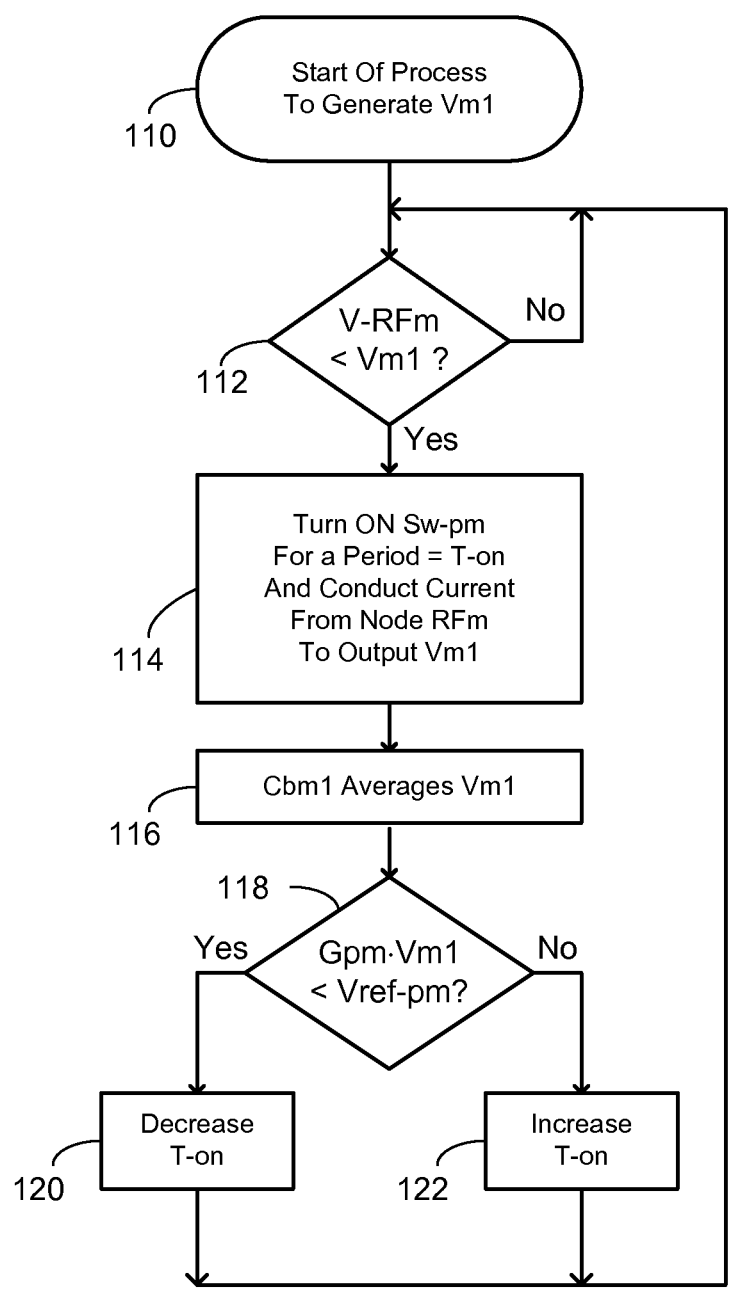
FIG. 10B is a flow chart relating to the operation of the circuit diagram of FIG. 10A.

With reference to FIG. 10A and FIG. 10B, there is shown a simplified circuit diagram in FIG. 10A of the system elements related to the switch Sw-pp shown in FIGS. 1 and 6 with an associated flow chart in FIG. 10B illustrating control of the "on time" of switch Sw-pm (switch Sw-pm closed) in order to regulate Vm1 to a predetermined value. Control commences at block 110. In block 112, the value of V-RFm is compared to the value of Vm1, and if V-RFp is less than the value of Vm1, controller 36 at block 114, turns on switch Sw-pm (switch Sw-gm closed) for a period T-on to conduct current from node RFm to output Vm1 through switch Sw-pm. At block 116, the average value of Vm1 is generated by the use of bypass capacitor Cbp1$cpm$. In block 118 the average value of Vm2 multiplied by a gain factor Gpm formed by resistors Rm1a and Rm1b is compared to a preselected reference voltage Vref-pm by the use of at least transconductor 40 and capacitor Ccpm shown in FIG. 6. The value of Vm1 multiplied by the gain factor Gpm is compared to Vref-pm in block 118 and if Vm1 multiplied by the gain factor Gpm is less than Vref-pm the "on time" of switch Sw-pm is decreased in block 120 and if Vm1 multiplied by the gain factor Gpm is greater than Vref-pm the "on time" of switch Sw-pm is increased in block 122. Control is then returned to block 112 and switch Sw-pm is turned on only after V-RFp becomes less than Vm1 and the process of controlling T-on proceeds through block 122. As described above, the bypass capacitors Cbp2, Cbp1, Cbm2 and Cbm1 serve to generate and therefore establish the average value of the converter output voltages Vp2, Vp1, Vm2 and Vm1, respectively.

Furthermore, as is shown in FIGS. 7A and 9A, the fixed dc voltage potential sources Vpf and Vmf respectively, may be set to values in accordance with requirements of contemplated applications and for example as shown in FIG. 1 for the present case, they are set to ground potential. It is also to be understood that the terms "ground", "ground potential" and "fixed dc voltage" when set to ground, all have the same or equivalent meaning and effect. Moreover, the voltage division effect of the resistors coupled to the converter output voltages as shown in the controllers of FIG. 3 to FIG. 6 provide thereby a "function" of the output voltages or in the alternative "scaled" output voltages which are related to the values assigned to the resistors in accordance with desired output voltage levels.

Although the invention has been described and illustrated in detail, it is to be clearly understood that the invention disclosed is by way of illustration and example only and is not to be taken by way of limitation, the spirit and scope of this invention being limited only by the language of the appended claims.

What is claimed is:

1. A timing controlled capacitor based AC-DC step-up converter configured to supply regulated output voltages to a load circuit comprising:
    a time varying input signal source providing a time varying input signal having positive and negative peaks;
    a first input capacitor having first and second terminals, the first terminal being coupled to the input signal source, the second terminal being coupled to a converter first positive output through a first rectifier, the second terminal further being switchably coupled to a converter ground through a first switch and to a converter second positive output through a second switch;
    a first switch controller coupled to said first switch for controlling the time at which the first switch is closed and the duration of such switch closure, wherein said first switch controller comprises a first integrator configured to integrate the difference between a function of the converter first positive output and a predetermined first reference voltage to provide thereby a first control signal and wherein the first switch controller causes the first switch to close when the voltage at the first input capacitor second terminal falls below ground level and further causes the first switch to open when the voltage at the first input capacitor second terminal falls below the value of the first control signal; and
    a second switch controller coupled to said second switch for controlling the time at which the second switch is closed and the duration of such switch closure, wherein said second switch controller comprises a second integrator configured to integrate the difference between a function of the converter second positive output and a predetermined second reference voltage to provide thereby a second control signal and wherein the second switch controller causes the second switch to close when the voltage at the first input capacitor second terminal rises above the converter second positive output and further causes the second switch to open when a function of the voltage at the first input capacitor second terminal rises above the value of the second control signal.

2. The converter of claim 1 wherein said first integrator comprises a voltage divider circuit to provide a first voltage division function whereby an average value of the converter first positive output is regulated to a predetermined value equal to a first reference voltage multiplied by the first voltage division function.

3. The converter of claim 1 wherein said second integrator comprises a voltage divider circuit to provide a second voltage division function whereby the average value of the converter second positive output is regulated to a predetermined value equal to a second reference voltage multiplied by the second voltage division function.

4. The converter of claim 1 wherein the first switch controller causes the first switch to open upon the occurrence of the negative peak of the time varying input signal and wherein the second switch controller causes the second switch to open upon the occurrence of the positive peak of the time varying input signal.

5. A timing controlled capacitor based AC-DC step-up converter configured to supply regulated output voltages to a load circuit comprising:
    a time varying input signal source providing a time varying input signal having positive and negative peaks;
    a second input capacitor having first and second terminals, the first terminal being coupled to the input signal source, the second terminal being coupled to a converter first negative output through a second rectifier, the second terminal further being switchably coupled to the converter ground through a third switch and to a converter second negative output through a fourth switch;
    a third switch controller coupled to said third switch for controlling the time at which the third switch is closed and the duration of such switch closure, wherein said third switch controller comprises a third integrator configured to integrate the difference between a function of the converter first negative output and a predetermined third reference voltage to provide thereby a third control signal and wherein the third switch controller causes the third switch to close when the voltage at the second input capacitor second terminal rises above ground level and further causes the third switch to open when the voltage at the second input capacitor second terminal rises above the value of the third control signal; and
    a fourth switch controller coupled to said fourth switch for controlling the time at which the fourth switch is closed and the duration of such switch closure, wherein said fourth switch controller comprises a fourth integrator configured to integrate the difference between a function of the converter second negative output and a predetermined fourth reference voltage to provide thereby a fourth control signal and wherein the fourth switch controller causes the fourth switch to close when the voltage at the second input capacitor second terminal is lower than the converter fourth negative output and further causes the fourth switch to open when a function of the voltage at the second input capacitor second terminal falls below the value of the fourth control signal.

6. The converter of claim 5 wherein said third integrator comprises a third voltage divider circuit to provide a third voltage division function whereby the average value of the converter first negative output is regulated to a predetermined value equal to a third reference voltage multiplied by the third voltage division function.

7. The converter of claim 5 wherein said fourth integrator comprises a fourth voltage divider circuit to provide a fourth voltage division function whereby the average value of the converter second negative output is regulated to a predetermined value equal to a fourth reference voltage multiplied by the fourth voltage division function.

8. The converter of claim 5 wherein the third switch controller causes the third switch to open upon the occurrence of the positive peak of the time varying input signal and wherein the fourth switch controller causes the fourth switch to open upon the occurrence of the negative peak of the time varying input signal.

9. A method of supplying regulated output voltages to a load circuit utilizing a timing controlled capacitor based AC-DC step-up converter configured to supply regulated output voltages to a load circuit, the converter comprising:
    a time varying input signal source providing a time varying input signal having positive and negative peaks; and a first input capacitor having first and second terminals, the first terminal being coupled to the input signal source, the second terminal being coupled to a converter first positive output through a first rectifier, the second terminal further being switchably coupled to a first fixed dc voltage source through a first switch;

the method comprising the steps of:

(a) comparing the voltage at the first input capacitor second terminal to the first fixed dc voltage;

(b) closing the first switch for a first predetermined time interval when the voltage at the first input capacitor second terminal is less than the first fixed dc voltage;

(c) conducting current through the first rectifier from the time varying input signal source to the load circuit when the first input capacitor second terminal voltage is greater than the converter first positive output voltage;

(d) providing an average value of the first positive output and multiplying the average value of the first positive output by a gain factor to provide a scaled first positive output and comparing the scaled first positive output to a predetermined first reference voltage;

(e) decreasing the first predetermined time interval when the scaled first positive output exceeds the predetermined first reference voltage, and increasing the first predetermined time interval when the scaled first positive output is less than the predetermined first reference voltage; and (f) repeating steps (a) through (e).

10. The method of claim 9, wherein the first input capacitor second terminal is coupled to a converter second positive output through a second switch, the method further comprising the steps of:

(g) comparing the voltage at the first input capacitor second terminal to the converter second positive output voltage;

(h) closing the second switch for a second predetermined time interval when the voltage at the first input capacitor second terminal is greater than the converter second positive output voltage;

(i) providing the average value of the second positive output and multiplying the average value of the second positive output by a gain factor to provide a scaled second positive output and comparing the scaled second positive output to a predetermined second reference voltage;

(j) decreasing the second predetermined time interval when the scaled second positive output is greater than the predetermined second reference voltage and increasing the second predetermined time interval when the scaled second positive output is less than the predetermined second reference voltage; and (k) repeating steps (g) through (j).

11. A method of supplying regulated output voltages to a load circuit utilizing a timing controlled capacitor based AC-DC step-up converter configured to supply regulated output voltages to a load circuit, the converter comprising:

a time varying input signal source providing a time varying input signal having positive and negative peaks; and a second input capacitor having first and second terminals, the first terminal being coupled to the input signal source, the second terminal being coupled to a converter first negative output through a second rectifier, the second terminal further being switchably coupled to a second fixed dc voltage source through a third switch, the method comprising the steps of:

(l) comparing the voltage at the second input capacitor second terminal to the second fixed dc voltage;

(m) closing the third switch for a third predetermined time interval when the voltage at the second input capacitor second terminal is greater than the second fixed dc voltage;

(n) conducting current through the second rectifier from the time varying input signal source to the load circuit when the second input capacitor second terminal voltage is less than the converter first negative output voltage;

(o) providing an average value of the first negative output and multiplying the average value of the first negative output by a gain factor to provide a scaled first negative output and comparing the scaled first negative output to a predetermined third reference voltage;

(p) decreasing the third predetermined time interval when the scaled first negative output is less than the predetermined third reference voltage and increasing the third predetermined time interval when the scaled first negative output is greater than the predetermined third reference voltage; and (q) repeating steps (l) through (p).

12. The method of claim 11, wherein the second input capacitor second terminal is coupled to a converter second negative output through a fourth switch, the method further comprising the steps of:

(r) comparing the voltage at the second input capacitor second terminal to the converter second negative output voltage;

(s) closing the fourth switch for a fourth predetermined time interval when the voltage at the second input capacitor second terminal is less than the converter second negative output voltage;

(t) providing the average value of the second negative output and multiplying the average value of the second negative output by a gain factor to provide a scaled second negative output and comparing the scaled second negative output to a predetermined fourth reference voltage;

(u) decreasing the fourth predetermined time interval when the scaled second negative output is less than the predetermined fourth reference voltage and increasing the second predetermined time interval when the scaled second negative output is greater than the predetermined fourth reference voltage; and (v) repeating steps (r) through (u).

13. The method of claim 9 wherein the first fixed dc voltage is ground.

14. The method of claim 11 wherein the second fixed dc voltage is ground.

15. A timing controlled capacitor based AC-DC step up converter configured to supply regulated output voltages to a load circuit comprising:

a time varying input signal source providing a time varying input signal having positive and negative peaks;

a first input capacitor having first and second terminals, the first terminal being coupled to the input signal source, the second terminal being coupled to a converter first output through a first rectifier, the second terminal further being switchably coupled to a first fixed dc voltage source through a first switch; and a first switch controller coupled to said first switch for controlling the time at which the first switch is closed and the duration of such switch closure, wherein said first switch controller comprises a first integrator configured to integrate the difference between a function of the converter first output and a predetermined first reference voltage to provide thereby a first control signal and wherein the first switch controller causes the first switch to close when the voltage at the first input capacitor second terminal falls below ground level and further causes the first switch to open when the voltage at the first input capacitor second terminal falls below the value of the first control signal.

16. The converter of claim 15 wherein the first input capacitor second terminal is coupled to a converter second output through a second switch, said converter further comprising:
- a second switch controller coupled to said second switch for controlling the time at which the second switch is closed and the duration of such switch closure, wherein said second switch controller comprises a second integrator configured to integrate the difference between a function of the converter second output and a predetermined second reference voltage to provide thereby a second control signal and wherein the second switch controller causes the second switch to close when the voltage at the first input capacitor second terminal rises above the second converter output and further causes the second switch to open when a function of the voltage at the first input capacitor second terminal rises above the value of the second control signal.

17. A timing controlled capacitor based AC-DC step up converter configured to supply regulated output voltages to a load circuit comprising:
- a time varying input signal source providing a time varying input signal having positive and negative peaks; comprising:
- a second input capacitor having first and second terminals, the first terminal being coupled to the input signal source, the second terminal being coupled to a converter third output through a second rectifier, the second terminal further being switchably coupled to a second fixed dc voltage source through a third switch; and
- a third switch controller coupled to said third switch for controlling a time at which the third switch is closed and a duration of such switch closure, wherein said third switch controller comprises a third integrator configured to integrate the difference between a function of the converter third output and a predetermined third reference voltage to provide thereby a third control signal and wherein the third switch controller causes the third switch to close when the voltage at the second input capacitor second terminal rises above ground level and further causes the third switch to open when the voltage at the second input capacitor second terminal rises above the value of the third control signal.

18. The converter of claim 17 wherein the second input capacitor second terminal is coupled to a converter fourth output through a fourth switch, said converter further comprising:
- a fourth switch controller coupled to said fourth switch for controlling the time at which the fourth switch is closed and the duration of such switch closure, wherein said fourth switch controller comprises a fourth integrator configured to integrate the difference between a function of the converter fourth output and a predetermined fourth reference voltage to provide thereby a fourth control signal and wherein the fourth switch controller causes the fourth switch to close when the voltage at the second input capacitor second terminal is lower than the converter fourth output and further causes the fourth switch to open when a function of the voltage at the second input capacitor second terminal falls below the value of the fourth control signal.

19. The converter of claim 15 wherein the polarity of the converter first output is positive with respect to ground.

20. The converter of claim 17 wherein the polarity of the converter first output is a negative with respect to ground.

21. The converter of claim 15 wherein the first fixed dc voltage source is ground.

22. The converter of claim 17 wherein the second fixed dc voltage source is ground.

23. A timing controlled capacitor based AC-DC step-up converter configured to supply regulated output voltages to a load circuit comprising:
- a time varying input signal source providing a time varying input signal having positive and negative peaks;
- a first input capacitor having first and second terminals, the first terminal being coupled to the input signal source, the second terminal being coupled to a converter first positive output through a first rectifier, the second terminal further being switchably coupled to a converter ground through a first switch and to a converter second positive output through a second switch;
- a first switch controller coupled to said first switch for controlling the time at which the first switch is closed and the duration of such switch closure, wherein said first switch controller comprises a first integrator configured to integrate the difference between a function of the converter first positive output and a predetermined first reference voltage to provide thereby a first control signal and wherein the first switch controller causes the first switch to close when the voltage at the first input capacitor second terminal falls below ground level and further causes the first switch to open when the voltage at the first input capacitor second terminal falls below the value of the first control signal;
- a second switch controller coupled to said second switch for controlling the time at which the second switch is closed and the duration of such switch closure, wherein said second switch controller comprises a second integrator configured to integrate the difference between a function of the converter second positive output and a predetermined second reference voltage to provide thereby a second control signal and wherein the second switch controller causes the second switch to close when the voltage at the first input capacitor second terminal rises above the converter second positive output and further causes the second switch to open when a function of the voltage at the first input capacitor second terminal rises above the value of the second control signal;
- a second input capacitor having first and second terminals, the first terminal being coupled to the input signal source, the second terminal being coupled to a converter first negative output through a second rectifier, the second terminal further being switchably coupled to the converter ground through a third switch and to a converter second negative output through a fourth switch;
- a third switch controller coupled to said third switch for controlling the time at which the third switch is closed and the duration of such switch closure, wherein said third switch controller comprises a third integrator configured to integrate the difference between a function of the converter first negative output and a predetermined third reference voltage to provide thereby a third control signal and wherein the third switch controller causes the third switch to close when the voltage at the second input capacitor second terminal rises above ground level and further causes the third switch to open when the voltage at the second input capacitor second terminal rises above the value of the third control signal; and
- a fourth switch controller coupled to said fourth switch for controlling the time at which the fourth switch is closed and the duration of such switch closure, wherein said fourth switch controller comprises a fourth integrator configured to integrate the difference between a function of the converter second negative output and a predetermined fourth reference voltage to provide thereby a fourth control signal and wherein the fourth switch controller causes the fourth switch to close when the voltage at the second input capacitor second terminal is lower than the fourth negative converter output and further causes the fourth switch to open when a function of the voltage at the second input capacitor second terminal falls below the value of the fourth control signal.

* * * * *